US009332435B2

(12) United States Patent
Zhou et al.

(10) Patent No.: US 9,332,435 B2
(45) Date of Patent: May 3, 2016

(54) DEVICE, SYSTEM AND METHOD USING EAP FOR EXTERNAL AUTHENTICATION

(71) Applicant: ZTE CORPORATION, Shenzhen, Guangdong (CN)

(72) Inventors: Xingyue Zhou, Shenzhen (CN); Shuang Liang, Shenzhen (CN); Chunhui Zhu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/352,355

(22) PCT Filed: Oct. 19, 2012

(86) PCT No.: PCT/CN2012/083190
§ 371 (c)(1),
(2) Date: Apr. 17, 2014

(87) PCT Pub. No.: WO2013/056668
PCT Pub. Date: Apr. 25, 2013

(65) Prior Publication Data
US 2014/0256291 A1    Sep. 11, 2014

(30) Foreign Application Priority Data
Oct. 20, 2011  (CN) .......................... 2011 1 0320947

(51) Int. Cl.
*H04W 12/06* (2009.01)
*H04L 29/06* (2006.01)

(52) U.S. Cl.
CPC ............ *H04W 12/06* (2013.01); *H04L 63/083* (2013.01); *H04L 63/0892* (2013.01); *H04L 63/162* (2013.01)

(58) Field of Classification Search
CPC ..... H04W 12/06; H04W 36/14; H04W 80/04; H04W 76/02; H04L 63/083; H04L 63/0892; H04L 63/162; H04L 65/1016

USPC ........................................................ 455/411
See application file for complete search history.

(56) References Cited

U.S. PATENT DOCUMENTS

| 7,984,291 B2 | 7/2011 | Eronen et al. |
| 2006/0179474 A1 | 8/2006 | Bichot |

(Continued)

FOREIGN PATENT DOCUMENTS

| CN | 10160924 | 4/2008 |
| CN | 101674580 | 3/2010 |

(Continued)

OTHER PUBLICATIONS

Supplemental European Search Report for European Application No. 12842443.9, Completed by the European Patent Office, Dated Apr. 23, 2015, 7 Pages.

3GPP TSG CT WG1 Meeting No. 73, Aug. 22-26, 2011, ZTE, 3 Pages, "Discussion on Support EAP a method of authentication and authorization with external networks over 3GPP and trusted non-3GPP."

(Continued)

*Primary Examiner* — George Eng
*Assistant Examiner* — Marcus Hammonds
(74) *Attorney, Agent, or Firm* — Brooks Kushman P.C.

(57) ABSTRACT

A User Equipment (UE), network-side device, system and method are disclosed for external authentication using an Extensible Authentication Protocol (EAP). The method includes, when the UE is initially attached to an Evolved Packet System (EPS) network via an Evolved UMTS Terrestrial Radio Access Network (E-UTRAN), the UE transmitting EAP authentication information required for the EAP authentication to a packet data network gateway and, after receiving EAP request, the UE transmitting a bearing resource modification request message carrying EAP response to the packet data network gateway. With the method, the UE can use the EAP authentication to implement authentication and authorization by an external authentication and authorization server via a GGSN/PDN GW in a process of connecting the UE to the EPS via a 3GPP access.

4 Claims, 5 Drawing Sheets

(56) References Cited

U.S. PATENT DOCUMENTS

| 2010/0035578 | A1 | 2/2010 | Ahmed |
| 2011/0271117 | A1* | 11/2011 | Qiang ............................ 713/181 |
| 2013/0291075 | A1* | 10/2013 | Sirotkin et al. ................... 726/5 |
| 2014/0096193 | A1 | 4/2014 | Naslund et al. |

FOREIGN PATENT DOCUMENTS

| CN | 101741768 | 6/2010 |
| JP | 2006521055 | 9/2006 |
| JP | 2011521510 | 7/2011 |

OTHER PUBLICATIONS

3GPP TSG WG3 (Security) Meeting No. 64, Jul. 11-15, 2011, 10 Pages, Nokia Corporation, Nokia Siemens Networks, "Authentication with external networks over S2b."

3GPP TSG SA WG2 Architecture—S2No. 61, Nov. 7-9, 2007, 3 Pages, Ericsson, "IP mobility selection."

SA WG2 Meeting No. 87, Oct. 10-14, 2011, 10 Pages, Juniper Networks, "AAA-driven Trusted WLAN Solution for SaMOG."

International Search Report for PCT/CN2012/083190, English Translation attached to original, Both completed by the Chinese Patent Office on Dec. 6, 2012, All together 5 Pages.

\* cited by examiner

DEVICE, SYSTEM AND METHOD USING EAP FOR EXTERNAL AUTHENTICATION

CROSS-REFERENCE TO RELATED APPLICATION

This application is the U.S. national phase of PCT Appln. No PCT/CN2012/083190 filed Oct. 19, 2012 which claims priority to Chinese Application No. 201110320947.7 filed Oct. 20, 2011, the disclosures of which are incorporated in their entirety by reference herein.

TECHNICAL FIELD

The present document relates to the field of communications, and in particular, to a device, system and method for external authentication using an Extensible Authentication Protocol (EAP).

BACKGROUND OF THE RELATED ART

The Extensible Authentication Protocol (EAP) is a general Protocol for point-to-point authentication, and can support a variety of authentication methods. The EAP does not specify an authentication method in a link establishment phase, but instead, postpones the process to an authentication phase. Thus, an authentication party can decide which authentication method to use after receiving more information. This mechanism also permits a point-to-point authentication party to simply transparently transmit the received authentication message to a backend authentication server, and the various authentication methods are to be actually implemented by the backend authentication server. After the link phase is completed, the authentication party transmits one or more request messages to a counterpart. There is a type field in the request message to specify an information type requested by the authentication party, such as an ID of the counterpart, a challenge word of MD5, a One Time Password (OTP) and a general token card etc. A challenge word of the MD5 corresponds to a challenge word of a CHAP authentication protocol. In typical conditions, the authentication party firstly transmits an ID request message, and then transmits other request messages. Of course, it is not necessary to firstly transmit the ID request message, and in the case that the identity of the counterpart is known (such as a leased line, a dial-up line etc.), this step can be skipped. The counterpart replies one response message to each request message. As with the request message, the response message also contains one type field, which corresponds to the type field in replied request message. The authentication party ends the authentication process by transmitting a success or failure message. Compared with other authentication methods, the advantage of the EAP is that the EAP can support a variety of authentication mechanisms, without specifying them in the pre-negotiation process of the LCP phase. Some devices (such as a network access server) need not to concern about the real meaning of each request message, but they serve as proxies to transparently transmit authentication messages to the backend authentication server. The devices only need to concern about whether the authentication result is the success or failure, and then end the authentication phase.

The Evolved Packet System (EPS for short) of the 3rd Generation Partnership Project (3GPP for short) is comprised of Evolved UMTS Terrestrial Radio Access Network (E-UTRAN for short), Mobility Management Entity (MME for short), Serving Gateway (S-GW), Packet Data Network Gateway (P-GW or PDN GW for short), Home Subscriber Server (HSS for short), Policy and Charging Rules Function (PCRF for short) entities and other supporting nodes.

In FIG. 1, an MME mobile management unit is responsible for control plane related works such as mobility management, non access stratum signaling processing and management of user mobile management context etc.; the S-GW is an access gateway device connected to the E-UTRAN, forwards data between the E-UTRAN and P-GW, and is responsible for caching paging waiting data; the P-GW is a border gateway between the EPS and a Packet Data Network (PDN for short), and is responsible for functions such as accessing of the PDN and data forwarding between the EPS and the PDN; and the PCRF is a policy and charging rules function entity, and is connected to an Internet Protocol (IP for short) service network of an operator via a receiving interface Rx to acquire service information, and in addition, the PCRF is connected to a gateway device in the network via a Gx/Gxa/Gxc interface, is responsible for initiating an establishment of IP bearer, ensures Quality of Service (QoS for short) of service data, and performs charging control.

In a process of an initial attachment/switch or establishment of a new PDN connection to the EPS network for a User Equipment (UE), the Gateway GPRS Support Node (GGSN)/PDN GW may perform authentication and authorization of a user, issuing of related configuration parameters (such as an IP address) etc. for the UE by an authentication server (which may be provided by a third-party) in an external packet data network. When the UE establishes a PDN connection through a 3GPP access networks, i.e., a GERAN/UTRAN/E-UTRAN, the UE transparently transmits the data needed to be authenticated and authorized by the external authentication and authorization server to the GGSN/PDN GW through a Protocol Configuration Option (PCO) information element, and then, the GGSN/PDN GW extracts authentication data of the user from the PCO, and includes the user authentication data in an authentication message transmitted to the external authentication and authorization server. After authenticating and authorizing the user, the external authentication and authorization server returns an authorization result and related data to the GGSN/PDN GW through an authentication response message. The GGSN/PDN GW includes the above authentication result and related data in the PCO to be returned to the UE. In the current standards, the PCO supports carrying Challenge Handshake Authentication Protocol (CHAP) and Password Authentication Protocol (PAP) parameters, namely, which are two kinds of authentication methods. With the development of the network security, the Extensible Authentication Protocol (EAP) is utilized by operators due to its better security, and also becomes potential requirements of the UE for external authentication and authorization method. However, in relative to one round of interaction for the CHAP and PAP authentications, there are two rounds of message interactions between the client and the server for the EAP authentication. The characteristics of the above EAP authentication determine that there will be influence on the current process of connecting the UE to the EPS.

SUMMARY OF THE INVENTION

For the potential requirements of the above UE for external authentication and authorization in the process of being connected to the EPS network by an EAP authentication, the embodiments of the present document proposes a flow of using the EAP authentication to implement authentication and authorization for an external authentication and authorization server via a GGSN/PDN GW in a process of connecting the UE to the EPS via a 3GPP access.

The embodiments of the present document provide a method for external authentication using an Extensible Authentication Protocol (EAP), comprising:

when a User Equipment (UE) is initially attached to an Evolved Packet System (EPS) network via an Evolved UMTS Terrestrial Radio Access Network (E-UTRAN), the UE transmitting EAP authentication information required for the EAP authentication to a packet data network gateway, and after receiving EAP request, the UE transmitting a Request Bearer Resource Modification message carrying EAP response to the packet data network gateway.

The UE including the EAP authentication information required for the EAP authentication in a Protocol Configuration Option (PCO) or a newly defined information element to transmit through an attachment request message, and including the EAP response in a PCO or a newly defined information element to transmit through the Request Bearer Resource Modification message, wherein, the EAP authentication information includes a user credential and/or a user name and a password.

The embodiments of the present document further provide another method for external authentication using an Extensible Authentication Protocol (EAP), comprising:

after receiving a session establishment request message carrying EAP authentication information, a packet data network gateway including extracted EAP authentication information in an access request message to transmit to an external authentication server, and after receiving the access request message, the external authentication server returning an access challenge message including EAP request to the packet data network gateway;

the packet data network gateway transmitting the EAP request in the access challenge message to a User Equipment (UE); and after receiving a bearer resource command message carrying EAP response, the packet data network gateway including the extracted EAP response in an access request message to transmit to an external authentication server, and after authenticating and processing the EAP response, the external authentication server returning an authentication result to the packet data network gateway, and the packet data network gateway transmitting the received authentication result to the UE.

The EAP authentication information, the EAP request, the EAP response and the authentication result are all included in an information element, which is a Protocol Configuration Option (PCO) or a newly defined information element.

The method further comprises:

after receiving an attachment request, a mobile management unit carrying the information element including the EAP authentication information in a session establishment request message to transmit to the packet data network gateway via a serving gateway;

the packet data network gateway transmitting the information element including the EAP request to the mobile management unit through a session establishment response message via a serving gateway, and the mobile management unit including the information element in an attachment acceptance message and transmitting the attachment acceptance message to the UE; and the packet data network gateway transmitting the information element including the authentication result to the mobile management unit through a bearer update request message via the serving gateway, and the mobile management unit transmitting the information element to the UE through a downlink Non Access Stratum (NAS) transmission message.

The embodiments of the present document further provide another method for external authentication using an Extensible Authentication Protocol (EAP), comprising:

when a User Equipment (UE) is initially attached to an Evolved Packet System (EPS) network via an UMTS Terrestrial Radio Access Network/GSM EDGE Radio Access Network (UTRAN/GERAN), the UE carrying EAP authentication information required for the EAP authentication when transmitting a Packet Data Protocol (PDP) context activation request; and after receiving a PDP activation acceptance message including the EAP request, the UE transmitting a PDP context modification request message carrying EAP response for the EAP request to a Gateway GPRS Support Node (GGSN)/packet data network gateway.

Both the EAP authentication information and the EAP response are included in a Protocol Configuration Option (PCO) or a newly defined information element.

The embodiments of the present document further provide another method for external authentication using an Extensible Authentication Protocol (EAP), comprising:

after receiving a Packet Data Protocol (PDP) context activation request, a Gateway GPRS Support Node (GGSN)/packet data network gateway carrying EAP authentication information in an access request message to transmit to an external authentication server, and after receiving the access request message, the external authentication server returning an access challenge message including EAP request to the GGSN/packet data network gateway;

the GGSN/packet data network gateway transmitting the EAP request to a User Equipment (UE) through a PDP activation acceptance message; and after receiving a PDP context modification request message, the GGSN/packet data network gateway extracting EAP response, including the EAP response in an access request message to transmit to an external authentication server, and after receiving an authentication result, transmitting the authentication result to the UE through a context update response message.

The GGSN/packet data network gateway including the EAP request in a Protocol Configuration Option (PCO) or a newly defined information element to transmit to the UE through a PDP activation acceptance message; and the GGSN/packet data network gateway including the EAP authentication result in a PCO or a newly defined information element to transmit to the UE through a context update response message.

The embodiments of the present document further provide a User Equipment (UE) for external authentication using an Extensible Authentication Protocol (EAP), wherein, the UE is configured to: when the UE is initially attached to an Evolved Packet System (EPS) network via an Evolved UMTS Terrestrial Radio Access Network (E-UTRAN), transmit EAP authentication information required for the EAP authentication to a packet data network gateway; and after receiving EAP request, transmit a Request Bearer Resource Modification message carrying EAP response to the packet data network gateway.

The UE is configured to include the EAP authentication information in a Protocol Configuration Option (PCO) or a newly defined information element to transmit to the packet data network gateway through an attachment request message, wherein, the EAP authentication information includes a user credential and/or a user name and a password; and include the EAP response in a PCO or a newly defined information element to transmit through the Request Bearer Resource Modification message.

The embodiments of the present document further provide a network side device for external authentication using an Extensible Authentication Protocol (EAP), comprising a packet data network gateway and an external authentication server, wherein, the packet data network gateway is configured to: after receiving a session establishment request message carrying EAP authentication information, include extracted EAP authentication information in an access request message to transmit to an external authentication server, and transmit the EAP request in an access challenge message to a User Equipment (UE); and after receiving a bearer resource command message carrying EAP response, include the extracted EAP response in an access request message to transmit to an external authentication server, and transmit the received authentication result to the UE; and the external authentication server is configured to: after receiving the access request message, return an access challenge message including EAP request to the packet data network gateway; and after authenticating and processing the received EAP response, return an authentication result to the packet data network gateway.

The network side device further comprises a mobile management unit and a serving gateway; wherein, the mobile management unit is configured to after receiving an attachment request, carry the information element including the EAP authentication information in a session establishment request message to transmit to the packet data network gateway via a serving gateway; carry the information element including the EAP request in an attachment acceptance message to transmit to the UE; and carry the information element including the EAP response in a bearer resource command message to transmit to the packet data network gateway via the serving gateway, and transmit the information element including an authentication result to the UE through a downlink Non Access Stratum (NAS) transmission message;

wherein, the information element is a Protocol Configuration Option (PCO) or a newly defined information element.

The embodiments of the present document further provide another User Equipment (UE) for external authentication using an Extensible Authentication Protocol (EAP), wherein, the UE is configured to: when the UE is initially attached to an Evolved Packet System (EPS) network via an UMTS Terrestrial Radio Access Network/GSM EDGE Radio Access Network (UTRAN/GERAN), carry EAP authentication information required for the EAP authentication when transmitting a Packet Data Protocol (PDP) context activation request; and after receiving a PDP activation acceptance message including the EAP request, transmit a PDP context modification request message carrying EAP response for the EAP request to a Gateway GPRS Support Node (GGSN)/packet data network gateway.

Both the EAP authentication information and the EAP response are included in a Protocol Configuration Option (PCO) or a newly defined information element.

The embodiments of the present document further provide another network side device for external authentication using an Extensible Authentication Protocol (EAP), comprising a Gateway GPRS Support Node (GGSN)/packet data network gateway and an external authentication server, wherein, the GGSN/packet data network gateway is configured to: after receiving a Packet Data Protocol (PDP) context activation request, carry EAP authentication information in an access request message to transmit to the external authentication server, transmit the EAP request to a User Equipment (UE) through a PDP activation acceptance message; and after receiving a PDP context modification request message, extract EAP response, include the EAP response in an access request message to transmit to an external authentication server, and after receiving an authentication result, transmit the authentication result to the UE through a context update response message; and the external authentication server is configured to: after receiving the access request message, return an access challenge message including EAP request to the GGSN/packet data network gateway; and after receiving the EAP response, authenticate and process the EAP response and return the authentication result to the GGSN/packet data network gateway.

The GGSN/packet data network gateway is configured to:

include the EAP request in a PCO or a newly defined information element to transmit to the UE through a PDP activation acceptance message; and include the EAP authentication result in a PCO or a newly defined information element to transmit to the UE through a context update response message.

The embodiments of the present document further provide a system for external authentication using an Extensible Authentication Protocol (EAP), wherein, the system includes the UE according to embodiment one and the network side device according to embodiment three; or the system includes the UE according to embodiment two and the network side device according to embodiment four.

In conclusion, the embodiments of the present document provide a UE, network-side device, system and method for external authentication using an EAP, which can use the EAP authentication to implement authentication and authorization by an external authentication and authorization server via a GGSN/PDN GW in a process of connecting the UE to the EPS via a 3GPP access.

PREFERRED EMBODIMENTS OF THE INVENTION

Figure 1:
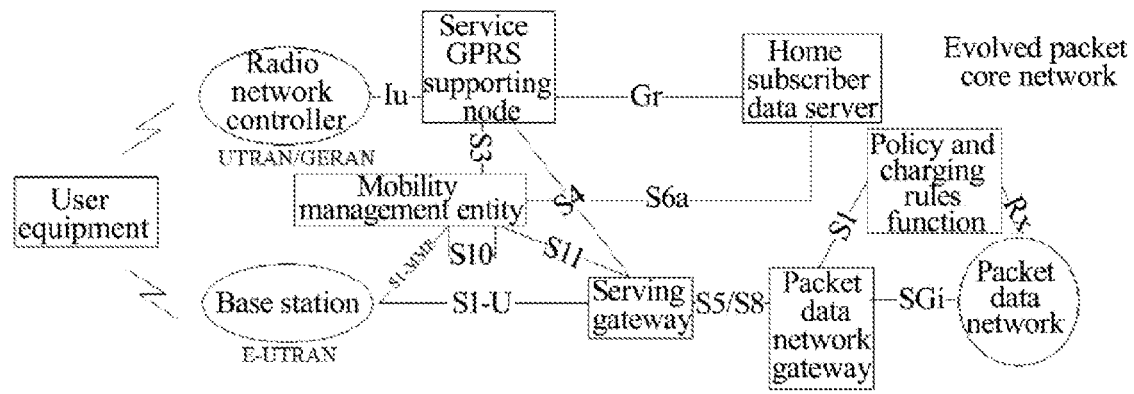
FIG. 1 is a diagram of a structure of an EPS system in a non-roaming condition.

The present document provides a UE, network side device, system and method for external authentication using the EAP.

Device Embodiments

Embodiment One

The present embodiment provides a UE for external authentication using an EAP, wherein, the UE is configured to: when being initially attached to an EPS network via an E-UTRAN, transmit EAP authentication information (including but not limited to a user credential, a user name and a password etc.) required for the EAP authentication to a packet data network gateway, and after receiving EAP request, transmit a Request Bearer Resource Modification message including EAP response to the packet data network gateway.

Alternatively, the UE is configured to include the EAP authentication information in a PCO or a newly defined information element to transmit through an attachment request message; and include the EAP response in a PCO or a newly defined information element to transmit through the Request Bearer Resource Modification message.

Embodiment Two

The present embodiment provides a UE for external authentication using an EAP, configured to, when being is initially attached to an EPS network via an UTRAN/GERAN, carry EAP authentication information (including but not limited to a user credential, a user name and a password etc.) required for the EAP authentication when transmitting a PDP context activation request; and after receiving a PDP activation acceptance message including the EAP request, transmit a PDP context modification request message carrying EAP response for the EAP request to a GGSN/packet data network gateway.

Alternatively, the UE includes both the EAP authentication information and the EAP response in a PCO or a newly defined information element.

Embodiment Three

The present embodiment provides a network side device for external authentication using an EAP, comprising a packet data network gateway and an external authentication server, wherein, the packet data network gateway is configured to: after receiving a session establishment request message carrying EAP authentication information, include extracted EAP authentication information in an access request message to transmit to an external authentication server, and transmit the EAP request in the access challenge message to a UE; and after receiving a bearer resource command message carrying EAP response, include the extracted EAP response in an access request message to transmit to an external authentication server, and transmit a received authentication result to the UE; and the external authentication server is configured to: after receiving the access request message, return an access challenge message including EAP request to the packet data network gateway; and after authenticating the received EAP response, return an authentication result to the packet data network gateway.

Alternatively, the network side device further comprises a mobile management unit and a serving gateway; wherein, the mobile management unit is configured to after receiving an attachment request, carry the information element including the EAP authentication information in a session establishment request message to transmit to the packet data network gateway via a serving gateway; carry the information element including the EAP request in an attachment acceptance message to transmit to the UE; and carry the information element including the EAP response in a bearer resource command message to transmit to the packet data network gateway via the serving gateway, and transmit the information element including an authentication result to the UE through a downlink NAS transmission message;

wherein, the information element is a PCO or a newly defined information element.

Embodiment Four

The present embodiment provides a network side device for external authentication using an EAP, comprising a GGSN/packet data network gateway and an external authentication server, wherein, the GGSN/packet data network gateway is configured to: after receiving a PDP context activation request, carry EAP authentication information in an access request message to transmit to the external authentication server, transmit the EAP request to a UE through a PDP activation acceptance message; and after receiving a PDP context modification request message, extract EAP response, include the EAP response in an access request message to transmit to an external authentication server, and after receiving an authentication result, transmit the authentication result to the UE through a context update response message; and the external authentication server is configured to: after receiving the request message, return an access challenge message including EAP request to the GGSN/packet data network gateway; and after receiving the EAP response, authenticate and process the EAP response and return the authentication result to the packet data network gateway.

Alternatively, the GGSN/packet data network gateway is configured to: include the EAP request in a PCO or a newly defined information element to transmit to the UE through a PDP activation acceptance message; and include the EAP authentication result in a PCO or a newly defined information element to transmit to the UE through a context update response message.

System Embodiment

The present embodiment provides a system for external authentication using an EAP, wherein, the system includes the UE according to embodiment one and the network side device according to embodiment three; or the system includes the UE according to embodiment two and the network side device according to embodiment four.

Method Embodiments

Embodiment Five

Figure 2:
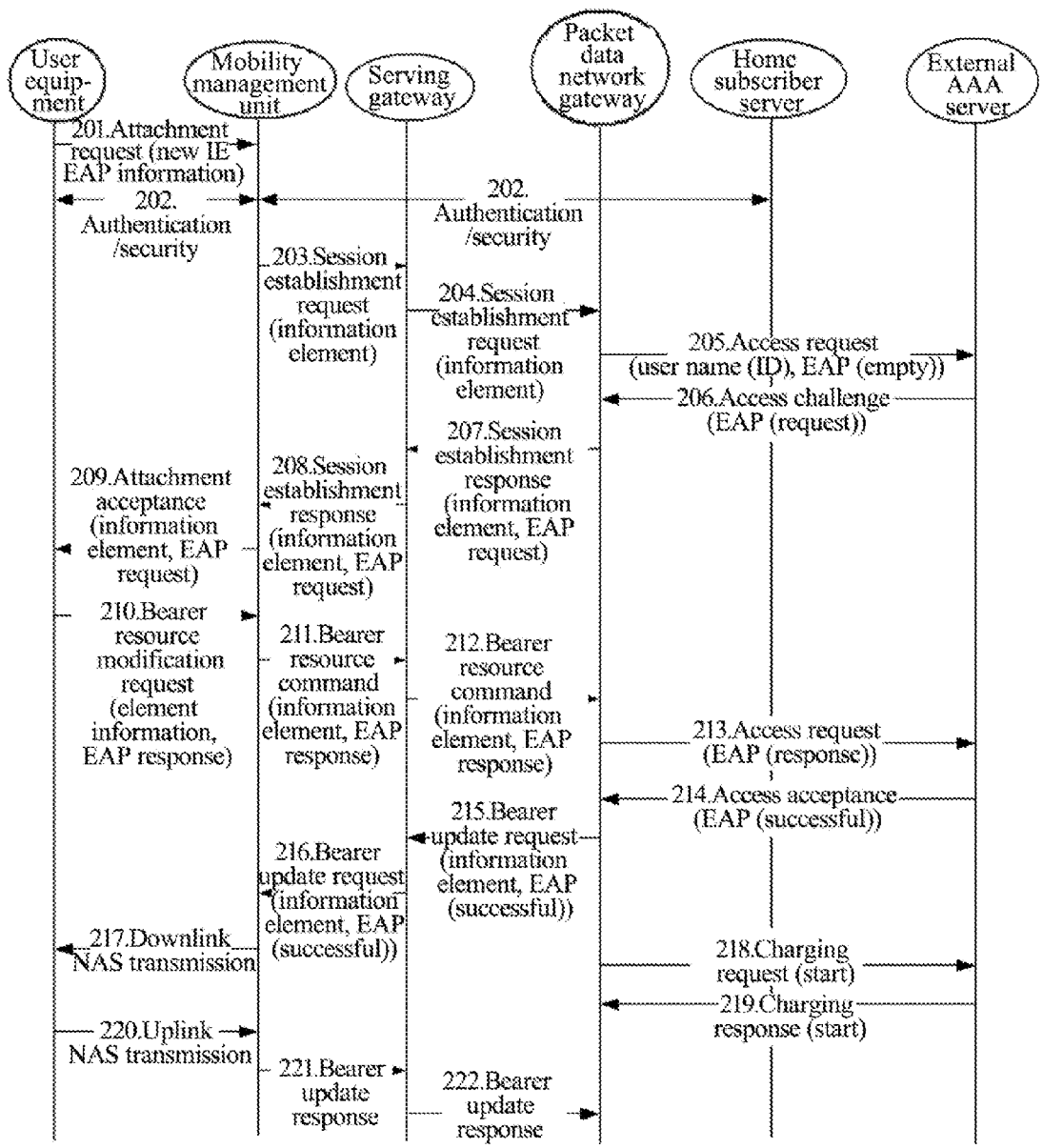
FIG. 2 is a flowchart of embodiment five (authentication of accessing the EAP through the E-UTRAN is successful)

FIG. 2 illustrates a flow of initially attaching a UE to an EPS network via an E-UTRAN, and using an EAP authentication for an authentication by an external Authentication, Authorization and Accounting (AAA) server, and resulting in a successful authentication, according to the method of the present document.

In step 201, the UE transmits EAP authentication information required for external authentication using the EAP to a mobile management unit through an attachment request message;

Alternatively, the EAP authentication information includes an identity and an EAP authentication and/or authorization parameter; and the EAP authentication information may be included in the PCO, or may also be included in a newly defined Information Element (IE).

In step 202, if the integrity protection is not performed on the attachment request message, or the integrity protection fails, a process of authentication for a user is performed;

in steps 203-204, the mobile management unit carries the PCO or newly defined IE including the EAP authentication information in a session establishment request message to transmit to a packet data network gateway via a serving gateway;

in steps 205-206, after receiving the session establishment request message, the packet data network gateway extracts EAP authentication information from the PCO or newly defined IE of the message, and includes the extracted authentication information in an access request message to transmit to an external AAA server, and after receiving the access request message, the AAA server returns an access challenge message including EAP request to the packet data network gateway;

in steps 207-208, the packet data network gateway includes the EAP request in the access challenge message in the PCO or newly defined IE to transmit to the mobile management unit through a session establishment response message via the serving gateway;

in step 209, the mobile management unit includes the PCO or newly defined IE in an attachment acceptance message to transmit to the UE, thus, the UE implements the initial attachment of the connection to the EPS and establishes a default bearer;

in step 210, after receiving the EAP request, the UE initiates a bearer resource modification flow, i.e., the UE transmits a Request Bearer Resource Modification message including EAP response for the above EAP request to the mobile management unit;

the EAP response may be included in the PCO or newly defined IE;

in steps 211-212, the mobile management unit carries the PCO or newly defined IE including the response in a bearer resource command message to transmit to the packet data network gateway via the serving gateway;

in step 213, the packet data network gateway extracts the EAP response from the PCO or newly defined IE, and includes the EAP response in an access request message to transmit to the external AAA server;

in step 214, after receiving the access request message, the AAA server confirms that the authentication is successful, and returns an access acceptance message including a result that the EAP authentication is successful to the packet data network gateway;

in steps 215-216, the packet data network gateway includes the EAP authentication result in the access acceptance message in the PCO or newly defined IE to transmit to the mobile management unit through a bearer update request message via the serving gateway;

in step 217, the mobile management unit includes the EAP authentication result information in the PCO or newly defined IE to transmit to the UE through a downlink NAS transmission message;

in steps 218-219, charging information is exchanged between the packet data network gateway and the external AAA server, and these two steps may be performed after the EAP authentication is successful; and in steps 220-222, the UE transmits a bearer update response message.

Embodiment Six

Figure 3:
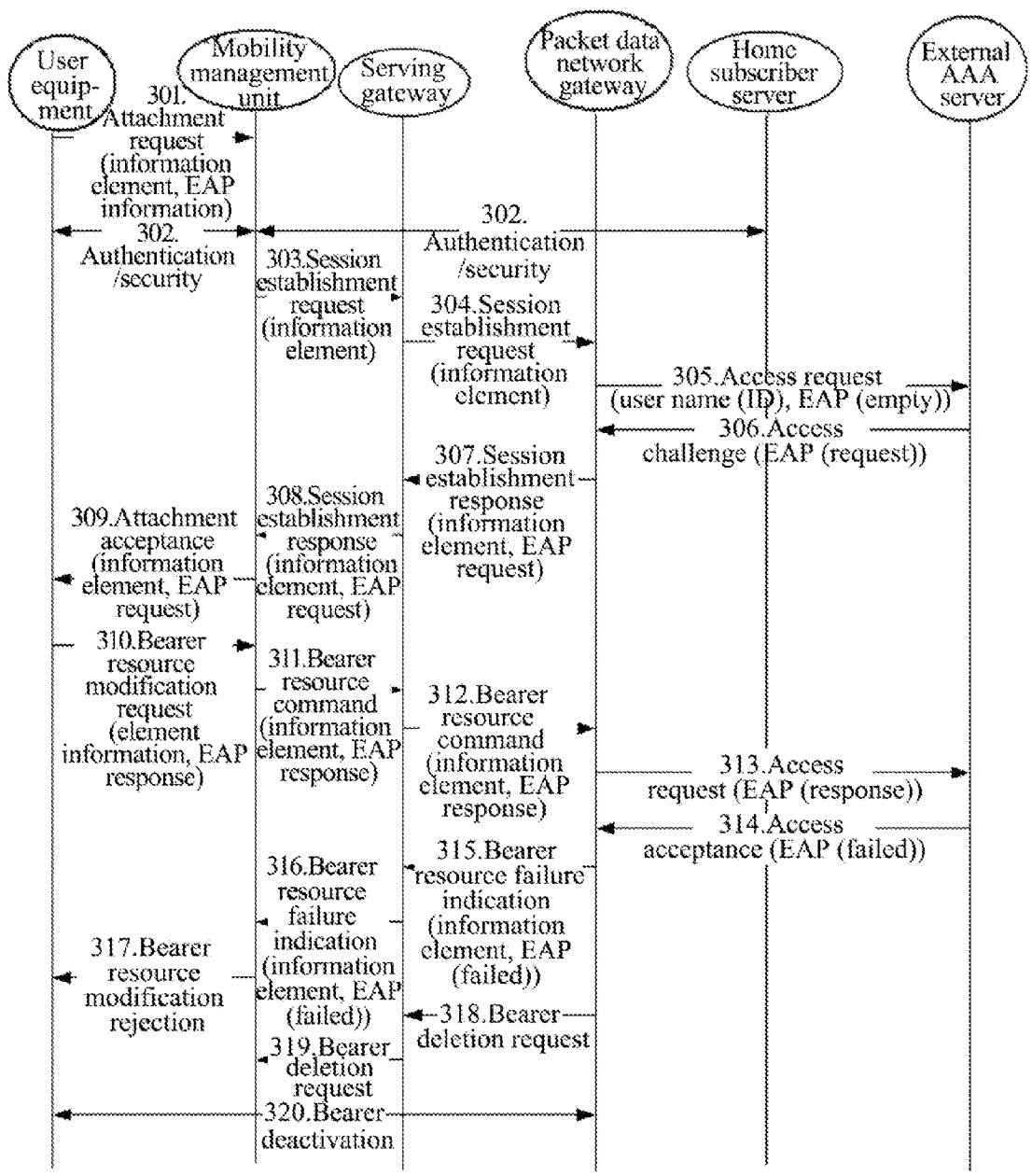
FIG. 3 is a flowchart of embodiment six (authentication of accessing the EAP through the E-UTRAN fails)

FIG. 3 illustrates a flow of initially attaching a UE to an EPS network via an E-UTRAN and using an EAP authentication for an authentication by an external AAA server and resulting in a failed authentication, according to the method of the present document. If the EAP authentication and authorization fails, the network or the UE will initiate deleting the current bearer.

Steps 301-303 are the same as steps 201-213 of embodiment five;

in step 314, after receiving the request message, the external AAA server confirms that the authentication fails, and returns an access response message including a result that the EAP authentication is failed to the packet data network gateway;

in steps 315-316, after finding that the authentication fails, the packet data network gateway includes the EAP authentication result information in the received access response message in the PCO or newly defined IE, and transmits a bearer resource failure indication message to the mobile management unit via a serving gateway;

in step 317, the mobile management unit includes the EAP authentication result information in the PCO or newly defined IE to transmit to the UE through a bearer resource modification rejection message;

in steps 318-319, if the current bearer needs to be deleted due to the failure of authentication, the packet data network gateway transmits a bearer deletion request message after performing step 315; and in step 320, a bearer deactivation flow is implemented between the UE and the network to delete the current bearer.

Embodiment Seven

Figure 4:
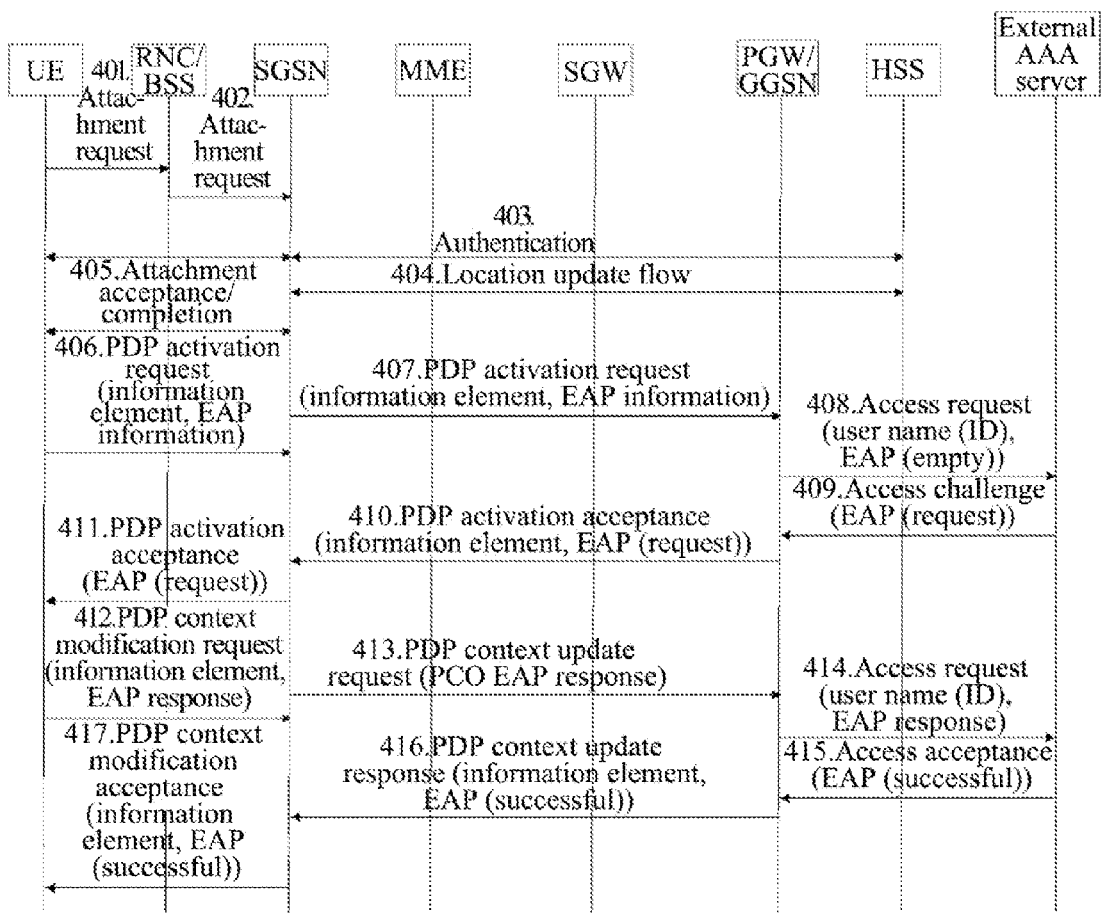
FIG. 4 is a flowchart of embodiment seven (authentication of accessing the EAP through the UTRAN/GERAN is successful)

FIG. 4 illustrates a flow of initially attaching a UE to an EPS network via an UTRAN/GERAN and using an EAP authentication for an authentication by an external AAA server and resulting in a successful authentication according to the method of the present document.

In steps 401-405, the UE initiates an attaching flow from the UTRAN/GERAN access system to be connected to the EPS;

in step 406, the UE transmits a PDP context activation request to the Service GPRS Supporting Node (SGSN), and the UE includes EAP authentication information required for the EAP authentication in the PCO or newly defined IE to transmit;

in step 407, the SGSN forwards the received PDP context activation request to the GGSN/PDN GW via the MME and SGW in turn;

in steps 408-409, the GGSN/PDN GW extracts EAP authentication information from the PCO or newly defined IE, includes the EAP authentication information in the access request message to transmit to the external AAA server, and after receiving the request message, the AAA server returns an access challenge message including an EAP request to the GGSN/PDN GW;

in step 410, the GGSN/PDN GW includes the EAP request in the access challenge message into the PCO or newly defined IE to transmit to the SGSN through a PDP activation acceptance message via the SGW and MME in turn;

in step 411, the SGSN forwards the received PDP activation acceptance message to the UE;

in step 412, after receiving the EAP request, the UE initiates a PDP context modification flow, i.e., the UE transmits a PDP context modification request message carrying EAP response for the above EAP request to the SGSN;

in step 413, the SGSN forwards the received PDP context modification request message to the GGSN/PDN GW via the MME and SGW in turn;

the EAP response may be included in the PCO, or may also be included in the newly defined IE;

in steps 414-415, the GGSN/PDN GW extracts EAP response from the PCO or newly defined IE, includes the EAP response into the access request message to transmit to an external AAA server, and after receiving the request message, the AAA server confirms that the authentication is successful, and returns an access acceptance message including a result that the EAP authentication is successful to the GGSN/PDN GW; and in steps 416-417, the GGSN/PDN GW includes the EAP authentication result information in the access acceptance message into the PCO or newly defined IE to transmit to the UE through a context update response message via the SGW, MME and SGSN in turn.

Embodiment Eight

Figure 5:
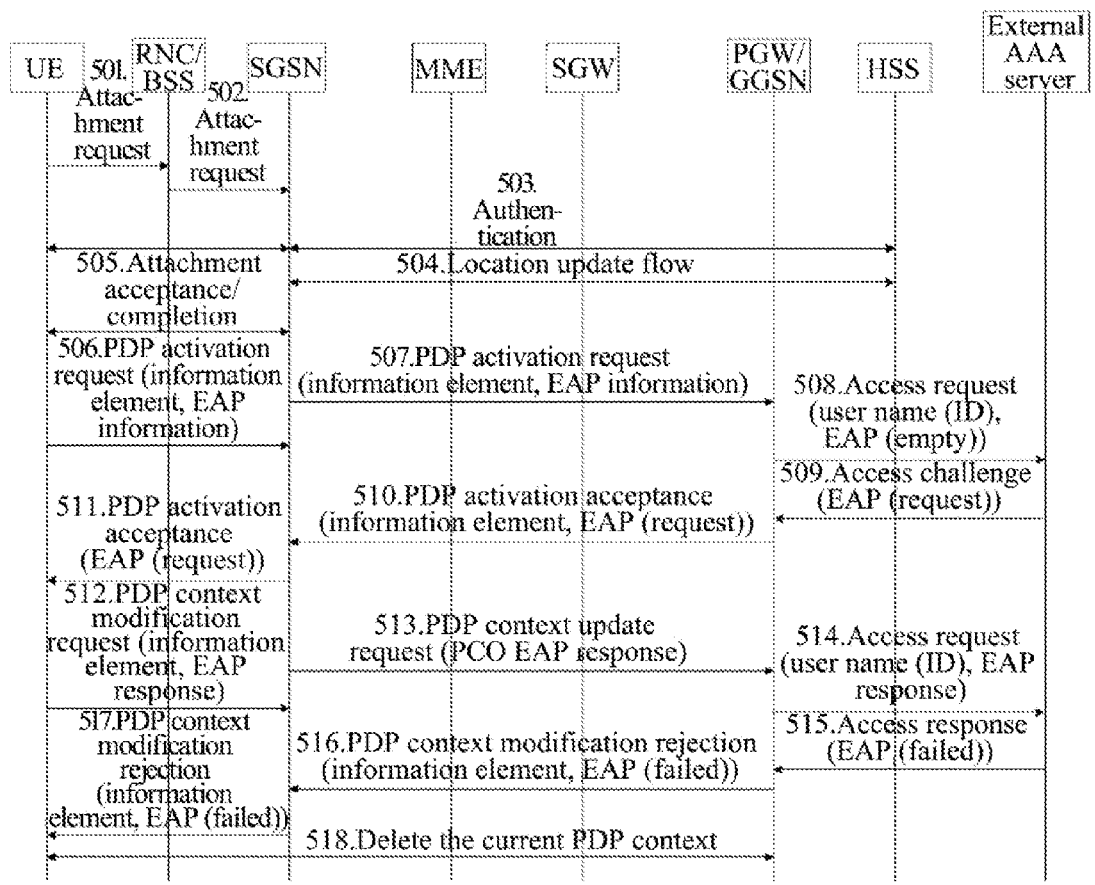
FIG. 5 is a flowchart of embodiment eight (authentication of accessing the EAP through the UTRAN/GERAN fails).

FIG. 5 illustrates a flow of initially attaching a UE to an EPS network via an UTRAN/GERAN and using an EAP authentication method for an authentication by an external AAA server and resulting in a failed authentication, according to the method of the present document. If the EAP authentication and authorization fails, the network or the UE will initiate deleting the current PDP context.

steps 501-514 are the same as steps 401-414 of embodiment seven;

in step 515, after receiving the request message, the external AAA confirms that the authentication fails, and returns an access response message including a result that the EAP authentication is failed to the GGSN/PDN GW;

in steps 516-517, after finding that the authentication fails, the GGSN/PDN GW includes the EAP authentication result information in the received response message into the PCO or newly defined IE to transmit to the UE through a PDP context update response message via the SGW, MME and SGSN in turn;

in step 518, the UE/network initiates deleting the current PDP context.

A person having ordinary skill in the art can understand that all or part of steps in the above method can be implemented by programs instructing related hardware, and the programs can be stored in a computer readable storage medium, such as a read-only memory, disk or CD-ROM etc. Alternatively, all or part of steps in the above embodiments can also be implemented by one or more integrated circuits. Accordingly, each module/unit in the above embodiments can be implemented in a form of hardware, or can also be implemented in a form of software functional module. The present document is not limited to any particular form of a combination of hardware and software.

Of course, the present document can have a plurality of other embodiments. Without departing from the spirit and substance of the present document, those skilled in the art can make various corresponding changes and variations according to the present document, and all these corresponding changes and variations should belong to the protection scope of the appended claims in the present document.

INDUSTRIAL APPLICABILITY

Compared with the prior art, the embodiments of the present document can use an EAP authentication to implement authentication and authorization by an external authentication and authorization server via a GGSN/PDN GW in a process of connecting the UE to the EPS via a 3GPP access.

What is claimed is:

1. A method for external authentication using an Extensible Authentication Protocol (EAP), comprising:
   when a User Equipment (UE) is initially attached to an Evolved Packet System (EPS) network via an Evolved UMTS Terrestrial Radio Access Network (E-UTRAN), the UE transmitting EAP authentication information required for an EAP authentication to a packet data network gateway, and after receiving EAP request, the UE transmitting a Request Bearer Resource Modification message carrying EAP response to a mobility management unit, and the mobile management unit transmitting a bearer resource command message carrying the EAP response to the packet data network gateway.

2. The method according to claim 1, wherein,
   the UE including the EAP authentication information required for the EAP authentication in a Protocol Configuration Option (PCO) or a newly defined information element to transmit through an attachment request message, and including the EAP response in a PCO or a newly defined information element to transmit through the Request Bearer Resource Modification message, wherein, the EAP authentication information includes a user credential and/or a user name and a password.

3. A system for external authentication using an Extensible Authentication Protocol (EAP), the system comprises:
   a user equipment (UE);
   a mobility management unit; and
   a packet data network gateway;
   wherein when the user equipment is initially attached to an Evolved Packet System (EPS) network via an Evolved UMTS Terrestrial Radio Access Network (E-UTRAN), the user equipment transmits EAP authentication information required for an EAP authentication to the packet data network gateway; and
   after the user equipment receives an EAP request, the user equipment transmits a Request Bearer Resource Modification message carrying EAP response to the mobility management unit, and the mobility management unit transmits a bearer resource command message carrying the EAP response to the packet data network gateway.

4. The system according to claim 3, wherein,
   when the UE is initially attached to the Evolved Packet System (EPS) network via the Evolved UMTS Terrestrial Radio Access Network (E-UTRAN),
   the UE is configured to include the EAP authentication information in a Protocol Configuration Option (PCO) or a newly defined information element to transmit to the packet data network gateway through an attachment request message, wherein, the EAP authentication information includes a user credential and/or a user name and a password; and include the EAP response in a PCO or a newly defined information element to transmit through the Request Bearer Resource Modification message.

* * * * *